(12) United States Patent
Bernard et al.

(10) Patent No.: US 9,542,317 B2
(45) Date of Patent: Jan. 10, 2017

(54) SYSTEM AND A METHOD FOR DATA PROCESSING WITH MANAGEMENT OF A CACHE CONSISTENCY IN A NETWORK OF PROCESSORS WITH CACHE MEMORIES

(71) Applicants: COMMISSARIAT A L'ENERGIE ATOMIQUE ET AUX ENE ALT, Paris (FR); BULL SAS, Les Clayes-sous-Bois (FR)

(72) Inventors: Christian Bernard, Saint Etienne de Crossey (FR); Eric Guthmuller, Ruy (FR); Huy Nam Nguyen, Fresnes (FR)

(73) Assignees: COMMISSARIAT A L'ENERGIE ATOMIQUE ET AUX ENERGIES ALTERNATIVES, Paris (FR); BULL SAS, Les Clayes-sous-Bois (FR)

( * ) Notice: Subject to any disclaimer, the term of this patent is extended or adjusted under 35 U.S.C. 154(b) by 44 days.

(21) Appl. No.: 14/408,402

(22) PCT Filed: Jun. 21, 2013

(86) PCT No.: PCT/FR2013/051452
§ 371 (c)(1),
(2) Date: Dec. 16, 2014

(87) PCT Pub. No.: WO2013/190247
PCT Pub. Date: Dec. 27, 2013

(65) Prior Publication Data
US 2015/0242318 A1    Aug. 27, 2015

(30) Foreign Application Priority Data

Jun. 22, 2012  (FR) ..................... 12 55923

(51) Int. Cl.
G06F 12/10    (2016.01)
G06F 12/08    (2016.01)
G06F 11/34    (2006.01)

(52) U.S. Cl.
CPC ....... G06F 12/0822 (2013.01); G06F 11/3409 (2013.01); G06F 12/084 (2013.01);
(Continued)

(58) Field of Classification Search
CPC .............. G06F 12/0822; G06F 12/0811; G06F 11/3409
(Continued)

(56) References Cited

U.S. PATENT DOCUMENTS 5,897,656 A    4/1999  Vogt et al.
6,622,214 B1   9/2003  Vogt et al.
(Continued)

FOREIGN PATENT DOCUMENTS

WO    WO 98/11488 A1    3/1998

OTHER PUBLICATIONS

International Search Report issued Aug. 27, 2013 in PCT/FR2013/051452 Filed Jun. 21, 2013.
(Continued)

*Primary Examiner* — Jae Yu
(74) *Attorney, Agent, or Firm* — Oblon, McClelland, Maier & Neustadt, L.L.P.

(57) ABSTRACT

A system for data processing with management of a cache consistency in a network of processors including cache memories, the network including plural nodes for access to a main memory interconnected with one another, a set of directories being distributed between nodes of the network, each directory including a table of correspondence between cache lines and information fields on the cache lines. The system includes a first sub-network for interconnection of
(Continued)

Figures 1, 2:
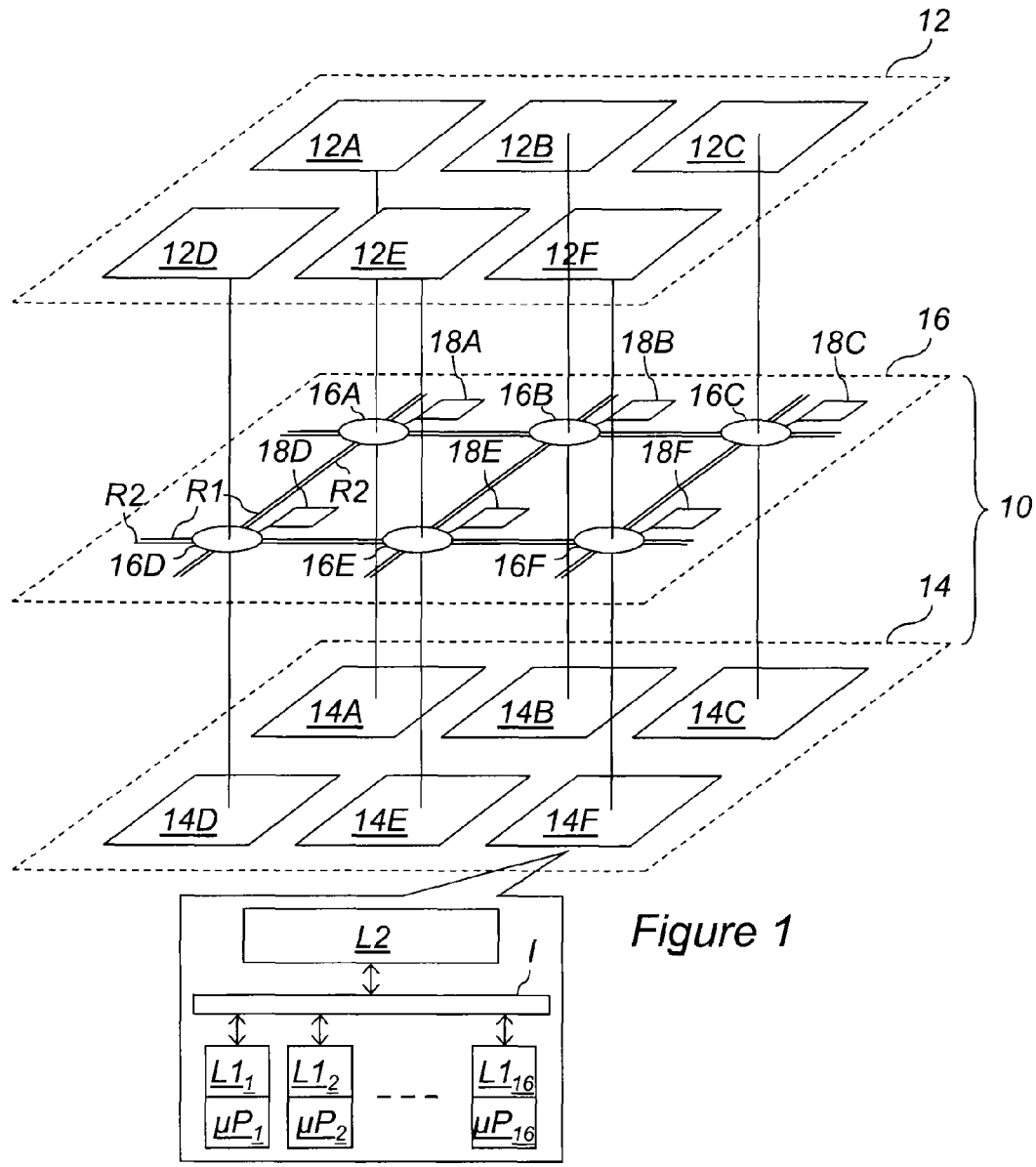

the nodes with one another, implementing a first message transmission protocol providing read/write access to the directories during any passage in the corresponding nodes of a message passing through the first sub-network, and a second sub-network for interconnection of the nodes with one another, implementing a second message transmission protocol, the second protocol excluding any read/write access to the directories during any passage in the corresponding nodes of a message passing through the second sub-network.

10 Claims, 2 Drawing Sheets

(52) U.S. Cl.
CPC ...... *G06F 12/0811* (2013.01); *G06F 12/0813* (2013.01); *G06F 12/0817* (2013.01); *G06F 2212/154* (2013.01); *G06F 2212/254* (2013.01); *G06F 2212/283* (2013.01); *G06F 2212/622* (2013.01)

(58) Field of Classification Search
USPC ........................................................ 711/130
See application file for complete search history.

(56) References Cited

U.S. PATENT DOCUMENTS

| 6,868,481 | B1 | 3/2005 | Gaither et al. |
| 7,177,987 | B2* | 2/2007 | Van Doren ......... G06F 12/0828 711/119 |
| 2005/0177688 | A1 | 8/2005 | Gaither et al. |
| 2006/0059315 | A1 | 3/2006 | Moll |
| 2009/0006769 | A1 | 1/2009 | Blumrich et al. |

OTHER PUBLICATIONS

Douglas E. Marquardt, et al., "A cache-coherent, distributed memory multiprocessor system and its performance analysis", IEICE Transactions on Information and Systems, vol. E75-D, No. 3, XP000307362, May 1992, pp. 274-290.

Noel Eisley, et al, "In-network cache coherence", Microarchitecture, $39^{th}$ Annual IEEE/ACM International Symposium, Dec. 2006, XP031034181, 12 Pages.

Manu Thapar, et al., "Linked list cache coherence for scalable shared memory multiprocessors", Proceedings of $7^{th}$ International Parallel Processing Symposium, Apr. 1993, pp. 34-43.

Yuang Zhang, et al., "Towards hierarchical cluster based cache coherence for large-scale network-on-chip", Proceeding of $4^{th}$ International Conference on Design & Technology of Integrated Systems in Nanoscal Era, Apr. 2009, 4 Pages.

French Search Report issued Feb. 20, 2013 in FR 1255923 Filed Jun. 22, 2012.

* cited by examiner

SYSTEM AND A METHOD FOR DATA PROCESSING WITH MANAGEMENT OF A CACHE CONSISTENCY IN A NETWORK OF PROCESSORS WITH CACHE MEMORIES

This invention relates to a system for data processing with management of a cache consistency in a network of processors equipped with cache memories. It also relates to a corresponding method and computer program.

A cache memory is intended to store, temporarily and as close as possible to the computing means of a computing system, for example one or more microprocessors, data also stored in a main memory and used for reading and writing by the computing means. By being inserted between the computing means and the main memory intended to be called upon for reading or writing of data by these computing means, and by being in the form of a smaller memory, but faster to access than the main memory, the cache memory makes it possible to accelerate computations. The main use of the cache memory is as follows: all operations of reading or writing data in the main memory performed by the computation means are first directed to the cache memory; if the data is in the cache memory (success, or cache "hit"), it is directly returned to the computing means (read) or updated in the cache memory (write); if, on the other hand, it is not in the cache memory (failure, or cache "miss"), it is transferred from the main memory to the cache memory before being provided to the computing means (read) or stored in the cache memory before being transferred to the main memory (write).

In practice, multiple cache memory levels may be provided between the computation means and the main memory.

In addition, a data line, defined as consisting of a predetermined number of successive data words stored in the cache or main memory (i.e. a data line consists of neighboring data), is the smallest quantity of data capable of being exchanged between a cache memory and the main memory, bearing in mind that a data word is the smallest quantity of data that must be accessible for reading or writing by the computation means. Thus, the cache memory takes advantage not only of the principle of temporal locality of the data, according to which data recently used by the computation means are very likely to be reused in the near future and must therefore be stored temporarily in the cache memory, but also of the principle of spatial locality of data, according to which the data neighboring data recently used by the computation means is very likely to be used in the near future and must therefore be stored temporarily in the cache memory with the data recently used, which it neighbors.

A correspondence must be established between each cache memory and the main memory in order to know how to temporarily assign a data line of the cache memory, called a cache line, to any one data line stored in the main memory, bearing in mind that the main memory comprises a number of data lines clearly higher than the number of cache lines. The known systems for managing correspondence between the cache memory and the main memory generally implement one of the following three principles:
  the fully associative correspondence,
  the pre-established correspondence,
  the N-way set associative correspondence.

The first principle of fully associative correspondence consists in assigning a priori any cache line to any one of the data lines of the main memory. No preliminary assignment of cache zones to main memory zones is established. The choice of assignment of a cache line to a data line is therefore free and is based, in practice, on availability or age criteria of the data in the cache, which is optimal for the hit rate of the cache memory, but has the disadvantage of being somewhat complex.

The second principle of pre-established correspondence consists in applying a modulo function to the address of each data line of the main memory, so that the same cache line is assigned a priori to a plurality of data lines, separated successively by a constant distance (i.e. the modulo) in the main memory. Thus, the preliminary assignment of cache zones to main memory zones is entirely deterministic and the assignment of a cache line to a data line is imposed by the modulo function. This is optimal in terms of simplicity, but has the disadvantage of a generally unsatisfactory cache memory hit rate.

Finally, the third principle of N-way set associative correspondence, which falls between the first two, consists in a preliminary assignment of a set to each data line of the main memory on the basis of its address, each set being distributed in the cache memory in N predefined ways, then in assigning any cache line to any one of the data lines of the main memory in the set assigned to it, i.e. concretely, one line per way. Thus, a preliminary assignment of cache zones to zones of the main memory is established, but the assignment of a cache line to a data line nevertheless retains some freedom in the set assigned to it. The final choice of assignment of a cache line to a data line is then made, in practice, on the basis of availability or age criteria of the data in the cache, similar to those performed in the first principle, but simplified.

In most systems for managing correspondence between a cache memory and a main memory, only one of these three principles is implemented. In general, the third principle is preferred.

The invention applies more specifically to a data processing system having a shared-memory multiprocessor architecture, i.e. a network of processors with a main memory shared between the processors and comprising a plurality of nodes for access to the main memory interconnected with one another. In this type of architecture, the processors may be combined in blocks of two to sixteen processors, these blocks generally being called "clusters". Each of these clusters has its own hierarchy of cache memories capable of temporarily storing cache lines and is directly connected to a node of the network. Reserved for very large systems at the beginning of the computing era, the multiprocessor architectures gradually spread to workstations, personal computers, on-board systems and mobile telephones, owing to constant progress in technological integration, in particular making it possible to integrate full systems on a chip ("System on Chip", or SoC).

The data processing system with cache consistency management in such an architecture then comprises:
  a set of directories distributed between the nodes of the network, each directory comprising a table of correspondence between cache lines and information fields on said cache lines,
  means for updating the directories by adding cache lines, modifying cache line information fields or deleting cache lines in the correspondence tables on the basis of a predefined cache consistency management protocol.

These directories are generally called "directories". More specifically, a directory associated with a node of the network of processors establishes and keeps up-to-date a list of the cache lines temporarily stored in the cache memory hierarchy of the cluster connected to it. In other words, a cache line corresponds to an entry of the directory. Each cache line of this list is then associated with information in the form of the aforementioned correspondence table. Depending on the cache consistency management protocol implemented, and depending on the way in which a set of cache memories temporarily storing the same cache line at a given time is to be represented, there may be more or less of this information, and various types.

In addition, it should be noted that, on the scale of a cluster of processors, each cache memory of a hierarchy is itself generally associated with a directory specific to it and that, itself, also gets a list of cache lines temporarily stored in said cache memory. The directory of a cache memory establishes the correspondence between the cache line and its address in the main memory. But in a cache memory hierarchy, a rule of inclusion of a lower level in an upper level is generally used so that, for example, a cache memory of level L2 shared between a plurality of cache memories of level L1 requires the latter to contain only cache lines that it contains itself. Thus, when a cache consistency management instruction (for example for cache line invalidation) is applied to an upper-level cache memory, it is propagated to all of the lower-level cache memories that are dependent upon it.

The cache consistency management protocol implemented in the data processing system may be of known different types, including an MSI ("Modified, Shared, Invalid") protocol, an MESI ("Modified, Exclusive, Shared, Invalid") protocol, an MOESI ("Modified, Owned, Exclusive, Shared, Invalid") protocol, or the like. Regardless of the type, in order for such a protocol to work, it is important for cache memory lists sharing cache data lines to be present in the network of processors in one form or another, so as to propagate the updates or instructions ensuring consistency of the cache data for read and write operations.

A first solution for representation of these lists, called centralized, may be envisaged when access to the main memory is distributed across the network, each node having access to a given partition of the main memory. This partition and assignment to a node are performed in a fixed manner, owing to a certain number of most significant bits of the data lines, or dynamically, for example by means of correspondence tables managed by the operating system of the network of processors.

According to this first solution, the list of nodes of the network sharing, in the cache, the same data line is entirely localized in the directory of the node assigned to the main memory partition comprising this data line. According to a first alternative representation, a bit vector is associated with the data line considered in the directory, each bit of said vector corresponding, for example, to a node or to a processor of the network. The bit is at "1" when the corresponding element comprises the cache data line and at "0" if not. But this representation quickly becomes ineffective when the network of processors becomes large, also bearing in mind that, in general, the number of data lines strongly shared in the cache is extremely small in a multiprocessor system. Thus, according to a second alternative representation, it is advantageous to construct a linked list of variable size, the head of which is located in the directory in association with the data line considered, and the following portion of which is stored in another so-called "heap" memory of the node. The list head may consist at least of the element that has a first copy of the cache data line, or, according to other equivalent embodiments, distinguished only by the compromise between the size of the directory and that of the heap memory, of the N first elements that have said copy. However, this second representation has the disadvantage of quickly causing saturation of the heap memory once the number of elements sharing the same data line becomes large.

In general, this first solution also has the disadvantage of always having to return to the centralizing node in order to manage the consistency of caches storing a data line, which is not optimal in terms of data traffic through the network and path lengths travelled by the messages.

Other solutions therefore consist in distributing the representation of a list of cache memories sharing the same cache data line between a plurality of nodes of the network.

A first of these other solutions is, for example, described in the article of Thapar et al, entitled "Linked list cache coherence for scalable shared memory multiprocessors", published in Proceedings of 7th International Parallel Processing Symposium, Newport, Calif. (US), pages 34-43, 13-16 Apr. 1993. It consists in linking to one another the caches sharing the same data line, from the node assigned to said data line in the main memory. In the directory of the node assigned to said data line, a field points to a first cache memory (or first node) temporarily storing a copy of said cache data line. If appropriate, in the directory of the first cache memory (or first node), a field associated with this cache line points to a second cache memory (or second node) also temporarily storing a copy of said cache data line, and so on and so forth. Each time a cache memory (or node) must be added to the list, it is inserted, for example, between the node assigned to the data line and the first cache memory of the linked list, then itself becoming the first cache memory. In practice, it transmits a request in this sense to the node at the head of the linked list, which provides it in response with the identifier of the first cache memory to which it must be linked.

A problem associated with this solution is that, to manage the consistency of caches sharing the same data line, it is necessary to pass through the network from one node to the other following the order of the chain. However, this order is historically defined independently of the topology of the network. The path to be travelled by the messages therefore is not optimal. Since aside from the cache consistency management messages, messages carrying processing data must furthermore pass through the network of processors, this generates traffic that can significantly slow the system.

A second of these other solutions with a distributed representation of lists is, for example, described in the article of Yuang et al, entitled "Towards hierarchical cluster based cache coherence for large-scale network-on-chip", published in Proceeding of 4th International Conference on Design & Technology of Integrated Systems in Nanoscal Era, Le Caire (EG), pages 119-122, Apr. 6-9, 2009. It consists in hierarchically organizing the network of processors by partitioning it into regions. For example, for a network of 256 processors, the whole system may be partitioned into 16 regions of 16 processors. In each region, for a given data line, one of the nodes centralizes in its directory the list of cache memories sharing said cache data line. It is, for example, the node topologically located in its region in the same location as the node assigned to the main memory partition containing said data line. At a first level, the node assigned to the main memory partition containing the data line considered comprises, in its directory, the list (in the form of a vector or linked list, for example, as for the centralized list representation solution) of regions storing, in the cache, a copy of said data line. At a second level, each centralizing node of each region for the data line considered comprises, in its directory, the list (in the form of a vector or a linked list, for example) of cache memories storing a copy of said data line.

This solution, even if it may improve traffic, is still somewhat rigid, in particular as it imposes constraints if the system is to be divided into independent subsystems.

A third of these other solutions of distributed list representation, which will be referred to as INCC in the remainder of the description, is, for example, described in the article of Eisley et al, entitled "In-network cache coherence", published in Proceeding of 39th Annual IEEE/ACM International Symposium on Microarchitecture, Orlando Fla. (US), pages 321-332, Dec. 9-13, 2006. It consists in associating a tree, represented in the directories of the different nodes of the network, with each data line having a copy stored in the cache in at least one of the cache memories of the network. This solution may also be envisaged when access to the main memory is distributed across the network, each node having access to a given partition of the main memory for which it is qualified as "home". The tree associated with a data line links the home node to all of the nodes of the network, the cluster of processors of which has a copy in the cache of said data line. Owing to the property of inclusion of cache memories of level L1 in those of level L2, the directory of a node of the network does not have to manage the list of cache memories of level L1 of its cluster of processors, which have a copy in the cache of the data line considered, this being managed by the cache memory of level L2. According to a possible implementation of the INCC solution, in the directory of each node of the network belonging to the tree associated with a data line comprising one or more copies in the cache, status fields are provided so as to indicate, inter alia, whether this node actually has a copy in the cache of the data line, which directions (for example North, South, East, West) lead to another node of the tree in the network, which direction leads to the node, called a "root", historically having first stored said data line in the cache, whether said node is itself the root node, and so on.

An advantage of this solution is that it defines paths to be followed by the messages in the trees while respecting the topology of the network. The path to be followed by the cache consistency management messages is therefore optimized. However, again, even if this solution improves traffic associated with the cache consistency management messages, the latter may still significantly slow the overall traffic and in particular the transmission of processing data, which reduces the performance of the system.

It may thus be desirable to have a data processing system that enables at least some of the aforementioned problems and constraints to be overcome.

A data processing system with management of a cache consistency in a network of processors equipped with cache memories is therefore proposed, said network having a main memory shared between the processors and comprising a plurality of nodes for access to the main memory interconnected with one another, said system comprising:
- a set of directories distributed between the nodes of the network, each directory comprising a table of correspondence between cache lines and information fields on said cache lines,
- a first sub-network for interconnection of nodes with one another implementing a first message transmission protocol, this first protocol providing read/write access to the directories during any passage, in the corresponding nodes, of a message passing through this first sub-network, the system further comprising:
- a second sub-network for interconnection of nodes with one another, different from the first sub-network, implementing a second message transmission protocol, this second protocol excluding any read/write access to the directories during any passage, in the corresponding nodes, of a message passing through this second sub-network.

Thus, owing to the invention, by providing two distinct sub-networks with two distinct transmission protocols in the data processing system, one of the sub-networks can be dedicated to the transit of messages requiring read/write access to the distributed directories, so as to facilitate the transmission of messages not requiring such access, in particular messages dedicated to the transmission of processing data from one node to another or more generally those not adhering to the cache consistency management protocol. The computation capacities of the system are thus not impaired by the implementation of this protocol, as sophisticated as it is.

Optionally, a data processing system according to the invention may comprise means for selective transmission of messages by one or the other of said first and second sub-networks on the basis of a predefined type of said messages.

Also optionally, the means for selective transmission are designed to:
- send a message through the first sub-network when it is of a type participating in a cache memory consistency management protocol, and
- send a message through the second sub-network when it is of a type participating in the transmission of processing data, Also optionally, for each node of the network:
- in the correspondence table of the directory of this node and for each cache line that it identifies, at least one field is provided, called a synchronizing field, indicating a possible wait for a message intended to pass through the second sub-network and concerning this cache line,
- the node is configured so as to have a first portion, forming part of the first sub-network and having read/write access to the directory of said node, and a second portion forming part of the second sub-network,
- the first portion is configured so as to apply a synchronizing field updating rule, upon receipt of a message concerning a cache line identified in the directory of said node and associated with another message intended to pass through the second sub-network, or upon receipt of a synchronization signal coming from the second portion, and
- the second portion is configured so as to transmit a synchronization signal to the first portion, upon receipt of a message intended for a partition of the main memory to which said node is associated or for a cache memory assigned to said node.

Also optionally, for each node of the network, the first portion comprises a protocol engine for read/write access to the directory of said node, said protocol engine being programmed, as a finite-state machine, in order to apply said synchronizing field updating rule.

Also optionally, the first and second sub-networks are packet switching data transmission networks, and:
- the first protocol is a protocol for transmission of messages in store-and-forward or cut-through mode, and
- the second protocol is a protocol for transmission of messages in wormhole flow control mode.

Also optionally, lists of cache memories sharing cache lines are represented in the network of processors for implementing a cache memory consistency management protocol, the representation of each list of cache memories sharing the same cache line being distributed between a plurality of directories of nodes of the processor network, including at least the directories of the nodes, called cache nodes, connected to processors, the cache memories of which temporarily store said cache line.

Also optionally, the directories between which the representation of a list of cache memories sharing the same cache line is distributed further comprise the directories of nodes for interconnection of said cache nodes so as to form a tree, distributed in the directories of the nodes of the network, for representation of said cache line, the correspondence table of each directory of a node of said tree comprising, for said cache line, status fields intended to indicate, inter alia, whether said node actually has a copy of the cache line, which directions among a set of predetermined directions lead to another node of the tree in the network, which direction leads to the node of the tree, called a "root", historically having first stored said cache line, and whether said node is itself the root node of the tree.

An electronic chip is also proposed, which comprises:
  a network of processors equipped with cache memories, said network having a main memory shared between the processors and comprising a plurality of nodes for access to the main memory interconnected with one another, and
  a data processing system as defined above.

A method for data processing with management of a cache consistency in a network of processors equipped with cache memories is also proposed, said network having a main memory shared between the processors and comprising a plurality of nodes for access to the main memory interconnected with one another, said method comprising the following steps:
  generation of directories distributed between the nodes of the network, each directory comprising a table of correspondence between cache lines and information fields on these cache lines,
  transmission of messages in a first sub-network for interconnection of nodes with one another implementing a first message transmission protocol, said first protocol providing read/write access to the directories during any passage, in the corresponding nodes, of a message passing through said first sub-network,
and further comprising the following step:
  transmission of messages in a second sub-network for interconnection of nodes with one another, different from the first sub-network, implementing a second message transmission protocol, said second protocol excluding any read/write access to the directories during any passage, in the corresponding nodes, of a message passing through said second sub-network.

A computer program downloadable from a communication network and/or recorded on a computer-readable medium and/or executable by a processor is also proposed, which includes instructions for executing the steps of a data processing method as defined above, when said program is executed on a computer.

Figure 3:
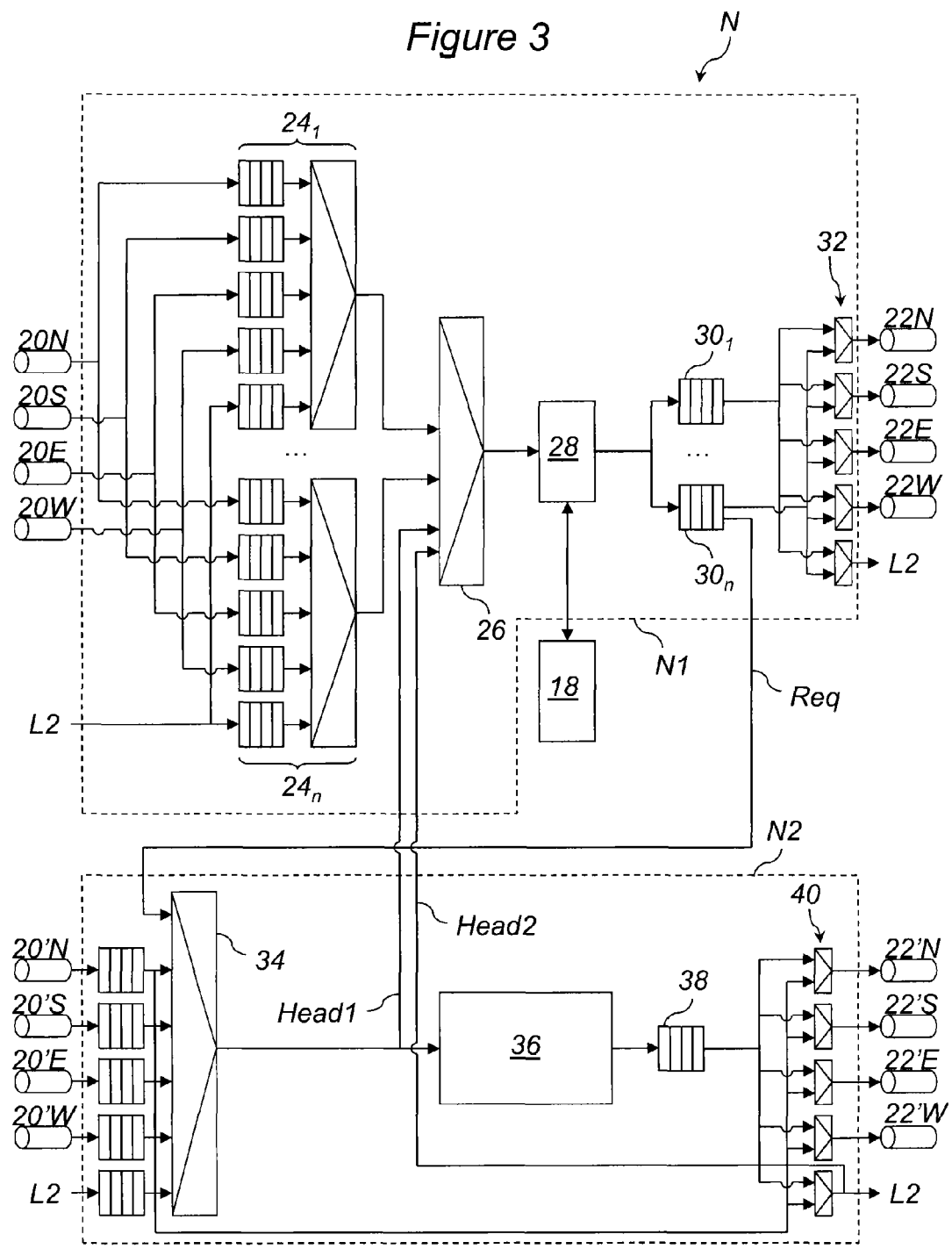

The invention will be easier to understand in view of the following description, provided solely as an example and with reference to the appended drawings, wherein:

FIG. 1 schematically shows the general structure of an electronic chip with a network of processors comprising a data processing system according to an embodiment of the invention, FIG. 2 shows the fields of a directory associated with a node of the network of processors implemented in the electronic chip of FIG. 1, and FIG. 3 schematically details the architecture of a node of the network of processors implemented in the electronic chip of FIG. 1.

The digital processing device shown diagrammatically in FIG. 1 comprises an electronic chip 10 connected to a high-capacity memory used as a main memory 12. The electronic chip 10 comprises a network of processors equipped with cache memories, said network having the main memory 12 shared between the processors and comprising a plurality of nodes for access to the main memory 12 interconnected with one another. In the particular example of FIG. 1, the main memory 12 is considered to be external to the electronic chip 10 and arranged in a layer above it, but it may be considered that the electronic chip 10 integrates this main memory 12 layer, in a multilayer architecture, for example. The main memory 12 layer is responsible for storing the data and program instructions intended to be used by the processors.

In the particular example of FIG. 1 as well, the processors are combined in clusters arranged in a matrix on the same lower layer 14 of the electronic chip 10.

Only six clusters denoted by references 14A, 14B, 14C, 14D, 14E and 14F are shown, but any number of clusters may of course be envisaged. Cluster 14F is presented in detail but the other clusters may have the same architecture. This is in the form of sixteen processors $\mu P_1, \mu P_2, \ldots, \mu P_{16}$ respectively equipped with sixteen first-level cache memories $L1_1, L1_2, \ldots, L1_{16}$. These sixteen first-level cache memories $L1_1, L1_2, \ldots, L1_{16}$ are linked to a common second-level cache memory L2 by means of a local interface I that manages, for example, the inclusion rules between the second-level cache memory and the first-level cache memories. The set of processors may be homogeneous (all of the processors are of the same type) or heterogeneous, using different types of processors: general processors (CPU), graphic processors (GPU) or signal processing processors (DSP), etc. In addition, a cluster may have a hierarchy of cache memories with more than two levels.

An upper layer 16 of the electronic chip 10 comprises the nodes for access of the clusters 14A, 14B, 14C, 14D, 14E and 14F to the main memory 12, in an amount of one node per cluster of the lower layer 14. Only six nodes denoted by references 16A, 16B, 16C, 16D, 16E and 16F are therefore represented but any number of nodes may of course be envisaged. These nodes are also interconnected with one another according to a matrix structure with four directions North (N), South (S), East (E) and West (W), which makes it possible to locate them topologically one with respect to another and to move in this two-dimensional mesh network which they constitute. Finally, each node 16A, 16B, 16C, 16D, 16E, 16F is connected to a corresponding partition 12A, 12B, 12C, 12D, 12E, 12F of the main memory 12 to which it is assigned, as indicated above. The interconnections of the nodes also make it possible to link the electronic chip 10 to any peripheral elements. Practically speaking, each node comprises one or more input and output buffer memories for the transmission of messages, in particular cache consistency management messages, in packet switching mode. In the example of FIG. 1, each node is represented as being connected to a cluster and to a partition of the main memory, but it is also possible to more generally envisage an architecture with depopulated nodes, i.e. nodes not having a connection to a cluster or to a partition of the main memory.

As also indicated above, a directory 18A, 18B, 18C, 18D, 18E or 18F is assigned to each node 16A, 16B, 16C, 16D, 16E or 16F of the upper layer 16, which directory establishes and keeps up-to-date the list of cache lines temporarily stored in the hierarchy of cache memories of the cluster 14A, 14B, 14C, 14D, 14E or 14F connected to it. The directories 18A, 18B, 18C, 18D, 18E or 18F are used, as will be described in detail in reference to FIG. 2, for purposes of cache consistency management.

The network for interconnection of nodes 16A, 16B, 16C, 16D, 16E, 16F with one another is a dual network comprising a first sub-network R1 and a second sub-network R2, both with a North (N), South (S), East (E) and West (W) matrix structure, i.e. two-dimensional meshing.

The first sub-network R1 implements a first message transmission protocol, this first protocol providing read/write access to directories 18A, 18B, 18C, 18D, 18E or 18F during any passage, in the corresponding nodes, of a message passing through this first sub-network R1. The messages concerned are those adhering to the cache consistency management protocol and the transmission of which through the nodes of the network therefore requires read/write access to the directories. These messages are generally small, in particular from one to two packets in packet transmission mode. However, in accordance with the cache consistency management protocol and in particular when it is implemented according to the INCC solution, the messages must, in most cases, be fully received by a node before being retransmitted, or before causing the transmission of induced output messages, in order to be capable of being processed effectively from the perspective of the cache consistency management protocol, i.e. without the risk of blocking a critical resource for a plurality of cycles. Nevertheless, it is possible to begin to analyze a message with the information of the address set, for example, without having the rest, but at the risk of causing a block if the rest of the message is blocked somewhere upstream.

This leads to the choice, for the first sub-network R1, of a protocol for message transmission in store-and-forward mode or cut-through or virtual cut-through mode. In store-and-forward mode, a node of the network waits until it has fully received and analyzed a packet of a data frame (i.e. a message) on one of its input interfaces in order to begin its retransmission on one or more of its output interfaces. As each packet of a message is itself subdivided into a plurality of basic units called "flits", this mode requires the placement in a buffer memory of all of the flits of the packet and delays its transmission. In return, this ensures the integrity of the packet and prevents errors. In cut-through mode, a node of the network may begin sending flits of a packet of a data frame to an output port at the beginning of the receipt of said packet at one of its input ports, but on the condition that it is ensured in advance that the entire packet can be received by the next node. This mode prevents switching delays and does not require that a complete packet be placed in the memory. However, it does not make it possible to fully analyze the packet before it is retransmitted and cannot therefore ensure the integrity or the complete arrival of the packet. Practically speaking, the virtual cut-through mode is preferred, and it should be noted that it is equivalent to the store-and-forward mode when an entire message is received on a single flit.

The second sub-network R2 implements a second message transmission protocol, this second protocol excluding any read/write access to the directories 18A, 18B, 18C, 18D, 18E or 18F during any passage in the corresponding nodes of a message passing through this second sub-network R2. The messages concerned are those not adhering to the cache consistency management protocol and the transmission of which through the nodes of the network does not therefore require read/write access to the directories. These messages are generally larger than the previous ones and comprise the processing data. However, they do not need to be fully received by a node before being retransmitted by this same node in the network.

This leads to the choice, for the second sub-network R2, of a protocol for message transmission in wormhole flow control mode. According to this flow control mode, a node of the network may begin to send flits of packets of a data frame to an output port at the beginning of the receipt of the frame at one of its input ports without any particular verification of the receiving capacities of the next node. This thus has advantages similar to the cut-through mode mentioned above, but on a finer scale and with even more flexibility.

For a more precise definition and a detailed explanation of the three modes mentioned above, called store-and-forward, virtual cut-through and wormhole, reference may be made to the article of T. Bjerregaard et al, entitled "A survey of research and practices of Network-on-Chips", published in 2006 in ACM Computing Surveys, Volume 38, Issue 1.

In the example of FIG. 1, and to simplify the presentation of a preferred embodiment of the invention, the dual network for interconnection of nodes 16A, 16B, 16C, 16D, 16E and 16F has been presented as comprising the two sub-networks R1 and R2 with identical two-dimensional meshes. However, more generally, it may be noted that the two sub-networks R1 and R2 may have different topologies since the two types of messages, those adhering to the cache consistency management protocol and those not, may follow different paths. Moreover, the cache consistency management protocol, for example implemented according to the INCC solution, may be adapted for a type of topology other than a two-dimensional mesh network.

The network for interconnection of nodes 16A, 16B, 16C, 16D, 16E and 16F with one another then comprises means for selective transmission of messages by one or the other of said first and second sub-networks according to a predefined type of said messages. These means may be implicitly implemented in the network by an automatic recognition of the types of messages in their heads. For example, the messages participating in the cache consistency management protocol are of one or more types specified in their heads and pass through the first sub-network R1. The messages participating in the transmission of processing data are of a type specified in their heads and pass through the second sub-network R2.

An example of a directory capable of being assigned to any one of the nodes 16A, 16B, 16C, 16D, 16E and 16F is shown in FIG. 2. It corresponds to a specific embodiment wherein the correspondence between a partition of the main memory 12 and the cache memory of level L2 of the corresponding cluster, or more generally between the main memory 12 and the cache memories of the network of processors, is established according to an N-way set associative correspondence principle. It also corresponds to a specific embodiment wherein the INCC solution is implemented.

In accordance with the principle of N-way set associative correspondence, a set is assigned to each data line of the main memory in a deterministic and non-configurable manner on the basis of its address, more specifically on the basis of a certain number of predetermined consecutive bits qualified as a "set" of the address @ of each data word in the main memory. In this set, the selection of a way is a priori free with verification of availability and/or age of the ways of the set.

It is the set of the address @ that defines the line that must be assigned to the corresponding data line in the correspondence table of the directory shown in FIG. 2. The first column of this correspondence table identifies the tag of the address @, i.e. the set of bits that, with the set, completely identify the data line containing address word @. The other columns of this correspondence table concern status fields that are more or less broad according to the cache consistency management protocols (MSI, MESI, MOESI, . . . ) and implementation solutions (INCC, . . . ) envisaged.

In accordance with the INCC solution, a binary validity field "V" indicates whether the entry is valid, i.e. whether the cluster associated with this directory is actually part of the tree associated with the data line considered. Four direction bits "NSEW" indicate the directions N for North, S for South, E for East and W for West, which lead to another node of the tree considered in the network of nodes. A two-bit root direction field "RD" indicates which of the directions previously indicated is that which leads to the root node of the tree considered. A binary copy field "C" indicates whether the cluster associated with this directory actually stores, in the cache memory, a shared copy (i.e. in the "Shared" state in the sense of cache consistency management protocols MSI, MESI et MOESI) of the data line considered. A binary root field "R" indicates whether the cluster associated with this directory is itself the root of the tree considered. Also in accordance with the INCC solution, the role of the root of a tree associated with a data line is to be the preferred (but not exclusive) provider of copies of the data line. Finally, in accordance with the INCC solution, a binary field "T" for indicating an invalidation in progress ("Touched") is added in the column of the correspondence table to indicate whether an invalidation in progress has been locally required for the data line considered in the node associated with said directory. It should be noted, however, that there are many ways to implement the INCC solution. Therefore, it is a family of solutions that use a way in which to maintain the lists of copies of cache lines in the form of virtual trees distributed across the network of processors.

Thus, when a processor transmits a data line request (read), this request is detected as being a message participating in the cache consistency management protocol. It is therefore first routed in the first sub-network R1 to the home node, i.e. that having access to the main memory 12 partition comprising said data line. Each time a node is passed, the corresponding directory is consulted in order to detect whether said node belongs to the tree associated with the data line required (if it exists). Once the tree is reached, the request is routed to its root, owing to direction information indicated in the corresponding fields, through the links of the tree. However, once the request reaches a node that has a shared copy of the data line, it is this node that sends a response and the data line to the transmitter of the request. When the response leaves the tree, a new branch of the tree is dynamically constructed as it progresses to the node of the transmitter of the request, which thus becomes a new node with a shared copy of the tree.

In accordance with the invention, the response and the data line sent by the node having a shared copy of the data line constitute two distinct but associated messages, one (i.e. the response) passing through the first sub-network R1 since it participates in the cache consistency management protocol, the other (i.e. the data line) passing through the second sub-network R2 since it does not participate in the cache consistency management protocol. There is then a problem of synchronization between these two associated messages for their reception by the node transmitting the data line request. It is thus proposed to enrich the correspondence table of the directory shown in FIG. 2 with at least one new status field dedicated specifically to the synchronization between associated messages passing independently through the two sub-networks. Thus, a field indicating a possible wait for a message intended to pass through the second sub-network R2, called the first synchronizing field WD1, is added in the column of the correspondence table in order to indicate whether processing data relating to a data line considered is temporarily being awaited in the node considered. This first synchronizing field makes it possible at least to ensure a synchronization of two associated messages when that passing through the first sub-network (i.e. the response) arrives at the node transmitting the data line request before that passing through the second sub-network (i.e. the data line). In the reverse configuration for receiving these two messages, an additional table may optionally be provided, for example a binary table indexed on request identifiers transmitted by the node considered, in which the field for a request is at a first binary value as long as the required data line has not reached the node considered, and is set at a second binary value upon its receipt. This table may be designed according to the LATT (Local Access Transaction Table) table model of cache memories of level L2 and enables the node considered to manage the fact that its cache memory of level L2 has or has not received the data line. Alternatively, the node transmitting a data line request may not have to manage this. In this case, it considers that the copy of the data line is already stored in its cache memory of level L2 and any new request to read this data line received by the node considered is transmitted to its cache memory of level L2, which must itself respond if it has a copy of this data line. If the cache memory of level L2 does not have such a copy, then:

if the node considered is not the root of the tree associated with this data line, the request must then be reconstructed on the basis of information contained in the response of the cache memory of level L2 and retransmitted to the root node, if the node considered is the root of the tree associated with this data line, two solutions are possible: sending a restart request to the transmitter of the request, or storing the read request while waiting for the data line, which assumes an additional buffer memory and an additional management of the case in which an invalidation arrives before the data line.

When a processor wants to modify a data line (write), it may, according to the cache consistency management protocol used, request exclusivity on this data line. If a tree already exists for this data line, it is dynamically destroyed by the transmission of an invalidation request propagated in the tree via the first sub-network R1. Also according to the protocol used, if the data line has already been modified by another node, it is returned to the home node, via the second sub-network R2, by the root node of the tree to be destroyed. Then the home node returns the data line for modification by the transmitter of the modification request, thus constructing a new tree in which the node of the transmitter of the modification request becomes the root node.

Also in accordance with the invention, the response and the data line sent by the root node to the home node, or sent by the home node to the transmitter of the modification request, constitute two distinct messages, one (i.e. the response) passing through the first sub-network R1 since it participates in the cache consistency management protocol, the other (i.e. the data line) passing through the second sub-network R2 since it does not participate in the cache consistency management protocol. There is also a problem of synchronization between these messages. With regard to the synchronization of messages sent by the home node to the transmitter of the modification request, it is solved as described above. With regard to the synchronization of messages sent by the root node to the home node, namely the acknowledgement of the invalidation request and the possible updating of the data line concerned by the invalidation, the process is, in principle, different. A second synchronizing field WD2 may therefore be provided in the column of the correspondence table in order to indicate whether an update of the data line considered which must pass through the second sub-network R2 must be awaited by the home node. This information must be provided by the root node, which is the only one whose cluster may have modified the data line. It is, for example, provided by the acknowledgement message including a field indicating whether the data line has or has not been modified by the root node. Finally, even though the synchronizing field WD2 is, in principle, different from the synchronizing field WD1, it is possible to merge them in a single binary field if the synchronization rules as defined in the node considered enable the two processes to be distinguished.

In general, the read or write transactions comprise at least one request and one response to said request. They sometimes particularly require, for good operation of the cache consistency management protocol, the transmission, in the network of processors equipped with caches, of requests for invalidation of cache lines and acknowledgement messages of these invalidations. For example, some cache consistency management protocols require that, before modifying a data line, a cache memory exclusively appropriate this line: all of the other cache memories having a copy of this line must be invalidated, make it known with an acknowledgement message and produce their copy if it was locally modified. The new modification may take place only when the acknowledgement process has been completed. Similarly, when a cache memory excludes a cache line, it may be required that at least some of the other cache memories sharing this cache data line also be invalidated. These invalidation/acknowledgement processes are sometimes relatively complex. Other cache consistency management protocols, which accept that a cache data line be shared for writing, require each writing in a cache memory to be transmitted to all of the other cache memories sharing the data line concerned. In every case, the exchanges generated by these transactions include both messages participating in the cache coherence management protocol and messages not participating in it, i.e. both messages that must pass through the first sub-network R1 and messages that must pass through the second sub-network. Thus, in general, a problem of synchronization between these messages occurs, the solution of which may be one of the two described above.

FIG. 3 shows a possible architecture of any one of the nodes of the network, associated with its directory, which will be designated by the generic reference 18.

This node, identified by the generic reference N applying to all of the aforementioned nodes 16A, 16B, 16C, 16D, 16E, 16F, comprises a first portion N1 forming part of the first sub-network R1 and a second portion N2 forming part of the second sub-network R2. The messages participating in the cache consistency management protocol pass through the first portion N1, while the messages not participating in the cache consistency management protocol, in particular the messages comprising processing data, pass through the second portion N2.

The first portion N1 is configured so as to have four inputs for the messages coming from other nodes of the network, one for each possible direction of origin in the matrix network of nodes 16A, 16B, 16C, 16D, 16E, 16F, i.e. an input 20N for the direction "North", an input 20S for the direction "South", an input 20E for the direction "East" and an input 20W for the direction "West". It also has an input for the messages coming from the cache memory of level L2 of the cluster to which it is directly connected.

This first portion N1 of the node N is also configured to have four outputs for the messages addressed to other nodes of the network, one for each possible destination direction in the matrix network of nodes 16A, 16B, 16C, 16D, 16E, 16F, i.e. an output 22N for the direction Nord", an output 22S for the direction "South", an output 22E for the direction "East" and an output 22W for the direction "West". It also has an output for the messages addressed to the cache memory of level L2 of the cluster to which it is directly connected.

As the messages participating in the cache consistency management protocol, which will be qualified transactions below, are capable of being of different types, each of the inputs of the first portion N1 is distributed between a plurality of virtual channels $24_1, \ldots, 24_n$, for example on the basis of the type of incoming transaction. Each virtual channel $24_i$ comprises as many buffer memories as inputs, i.e. five in this example, and a multiplexer for performing, at each instant, a selection between the inputs and providing only one output. The outputs of the virtual channels $24_1, \ldots, 24_n$ are provided at the input of a multiplexer arbiter 26 designed to choose, at each instant, which virtual channel may have access to a protocol engine 28 of the node N. It is this protocol engine 28 that has access to the directory 18 of the node N for embodiment of the cache consistency management protocol implemented, and for the synchronization of the messages passing through the sub-networks R1 and R2. It then determines how to respond to each incoming transaction, and in particular which output(s) of the portion N1 of the node N to transmit it to after its local processing. Thus, the portion N1 of the node N comprises as many output buffer memories $30_1, \ldots, 30_n$ as virtual channels, at the output of the protocol engine 28, and as many output multiplexers (identified by the general reference 32) as outputs of the node, i.e. five output multiplexers 32, at the output of the output buffer memories $30_1, \ldots, 30_n$. Each output multiplexer 32 more precisely receives, at the input, the output of all of the output buffer memories $30_1, \ldots, 30_n$.

The operation of the protocol engine 28 is conventional and will not be described in detail. It should simply be specified that it is a serialization point and that each transaction, request or response, is processed atomically by reading the state of the line addressed by the transaction in the directory, by a decision based on the state of the line read, then by sending at least one output message to at least one of the output buffer memories.

One of the decisions made by the protocol engine 28 may be to update one of the synchronizing fields WD1 or WD2 according to the transaction received and predetermined updating rules. These rules may in particular take the form of one or more finite-state machines: for example, a first finite-state machine is defined so as to be applied when the node N is the home node of the data line that is the object of the transaction and a second finite-state machine is defined in order to be applied otherwise. In consideration of the different ways in which to implement the INCC solution, there are numerous alternatives for synchronizing messages passing through the first and second sub-networks derived therefrom. They will not be described in detail.

Another of the decisions made by the protocol engine 28 may be to read a data line in the main memory 12, more specifically in the partition of the main memory to which the node N is assigned. A request denoted Req is then sent to the second portion N2, which manages the non-protocol message transmissions between the node N and the other nodes, the main memory partition to which the node N is assigned or the cache memory of level L2 of the cluster directly connected to the node N. This request is sent with appropriate parameters so that the data line read by the second portion N2 can be placed in a data packet with the correct destination.

The second portion N2 is configured so as to have four inputs for the messages coming from other nodes of the network, one for each possible direction of origin in the matrix network of nodes 16A, 16B, 16C, 16D, 16E and 16F, i.e. an input 20'N for the direction "North", an input 20'S for the direction "South", an input 20'E for the direction "East" and an input 20'W for the direction "West". It also has an input for the messages coming from the cache memory of level L2 of the cluster to which it is directly connected.

This second portion N2 of the node N is also configured to have four outputs for the messages addressed to other nodes of the network, one for each possible destination direction in the matrix network of nodes 16A, 16B, 16C, 16D, 16E and 16F, i.e. an output 22'N for the direction "North", an output 22'S for the direction "South", an output 22'E for the direction "East" and an output 22'W for the direction "West". It also has an output for the messages addressed to the cache memory of level L2 of the cluster to which it is directly connected.

For the messages not participating in the cache consistency management protocol, which are primarily messages containing processing data or sometimes but rarely restart messages for which there is no quality of service to be offered and which do not disrupt the transmission of processing data, it is unnecessary to provide a plurality of virtual channels in the second portion N2 of the node N. However, as for each virtual channel of the first portion N1, in the single transmission channel of the portion N2, there are as many buffer memories as inputs, i.e. five in this example, and a multiplexer 34 for access to the main memory 12, more specifically the main memory 12 partition to which the node N is assigned, in order to perform, at each instant, a selection between the inputs and to provide only one output. The multiplexer 34 receives, aside from the data coming from the five aforementioned buffer memories intended to be transmitted to the main memory 12, any request Req to read or update a data line in the main memory 12, this request Req coming from the first portion N1 and concerning the data line stored or intended to be stored in the main memory partition to which the node N is assigned. The output of the multiplexer 34 is provided at the input of a controller 36 of access to the main memory 12 partition to which the node N is assigned. This access controller 36 makes it possible to manage read or write access to the main memory 12 according to the content of the message transmitted by the multiplexer 34. When the access desired is to read a data line, the access controller 36 reads this data line in the main memory 12 partition to which the node N is assigned and provides it to an output buffer memory 38 of portion N2 of the node N. Portion N2 of the node N comprises as many output multiplexers (identified by general reference 40) as outputs of the node, i.e. five output multiplexers 40, at the output of the output buffer memory 38.

The messages not participating in the cache consistency management protocol moreover do not all need read or write access to the main memory 12 partition to which the node N is assigned. Therefore, the five input buffer memories are also directly connected to the five output multiplexers 40, for direct output routing of messages not needing to be processed by the access controller 36 and therefore also by the multiplexer 34. More specifically, each input buffer memory of the portion N2 corresponding to a direction from which the messages may come is directly connected to each output multiplexer, with the exception however of that corresponding to its direction.

Finally, for reasons of synchronization between messages participating in the cache consistency management protocol and messages not participating in it, the heads Head1 of messages directed at the output of the multiplexer 34 to the access controller 36 (i.e. those comprising data for which the node N is the "home" node) and the heads Head2 of messages directed to the output L2 (i.e. those comprising data concerning a processor of the cluster directly associated with the node N), are also routed to the first portion N1, more specifically at the input of the multiplexer arbiter 26 with a high priority, for updating of the corresponding line of the directory 18. They thus act as signals of synchronization between the second portion N2 and the first portion N1. They are in particular used by the protocol engine 28 in order to update synchronizing fields WD1 and WD2 according to a predefined updating rule for the node considered, this rule being capable of being different depending on whether the node is a home node for the data line considered or a node transmitting a request to read/write the data line considered.

It clearly appears that system for data processing with management of a cache consistency as described above is particularly suitable for a network of processors for which different types of messages involve different routing strategies capable of being distributed in two sub-networks with different data transmission protocols. In particular, the protocol messages do not have the same constraints as the processing data messages and the fact of sending them through distinct sub-networks fluidizes the exchanges, in particular in a configuration implementing a distributed representation of lists of shared cache data lines.

The implementation of the invention is therefore particularly, but not exclusively, appropriate in the context of an INCC representation. In the different examples with distributed representation of the lists mentioned above, it is, for example, also appropriate in the context of a representation by partition into regions of the processor network. Indeed, according to this solution, a request to read a data line must be addressed to the local representative (in region terms) of the home node. It is this local representative that transmits the request to the real home node if it cannot itself send the required data line or, in an alternative closer to the INCC solution, a local cache memory of level L2 may locally provide the data line required in order to prevent overloading of the main memory. However, even in case of a hit, it is necessary to send a read request to the home node. The use of a sub-network dedicated to data transmission then makes it possible to directly send the data to the requester without going through the local representative of the home node. The routing function is therefore different for the processing data and for the protocol messages, so that the implementation of the invention is also advantageous in this case. It makes it possible, as in the INCC solution, to decouple the protocol portion from the data transmission portion in order to optimize each sub-network and use different routing functions. In addition, the same problems of synchronization between the two sub-networks occur and are solved in a similar manner.

It should finally be noted that the invention is not limited to the embodiment described above. It will indeed appear to a person skilled in the art that various modifications may be made to the embodiment described above, in light of the teaching disclosed herein. In the claims that follow, the terms used must not be interpreted as limiting the claims to the embodiment disclosed in this description, but must be interpreted so as to include all equivalents that the claims are intended to cover owing to their wording and that can be carried out by a person skilled in the art applying general knowledge to the implementation of the teaching disclosed herein.

The invention claimed is:

1. A system for data processing with management of a cache consistency in a network of processors including cache memories, the network including a main memory shared between the processors and a plurality of nodes for access to the main memory interconnected with one another, the system comprising:
    a set of directories distributed between the nodes of the network, each directory comprising a table of correspondence between cache lines and information fields on the cache lines;
    a first sub-network for a first physical interconnection of the nodes with one another implementing a first message transmission protocol, the first protocol providing read/write access to the correspondence tables of the directories during any passage, in the corresponding nodes, of a message passing through the first sub-network;
    a second sub-network for a second physical interconnection of the nodes with one another, separate from the first sub-network, implementing a second message transmission protocol, the second protocol excluding any read/write access to the correspondence tables of the directories during any passage, in the corresponding nodes, of a message passing through the second sub-network.

2. The system for data processing according to claim 1, further comprising means for selective transmission of messages by one or the other of the first and second sub-networks according to a predefined type of the messages.

3. The system for data processing according to claim 2, wherein the selective transmission means is configured to:
    send a message through the first sub-network when the message is of a type participating in a cache memory consistency management protocol, such a message type including any cache line request message and any message of response to a cache line request not comprising the cache line, and
    send a message through the second sub-network when the message is of a type participating in the transmission of processing data, such a message type including any message having a cache line.

4. The system for data processing according to claim 1, wherein, for each node of the network:
    in the correspondence table of the directory of the node and for each cache line that it identifies, at least one field is provided, as a synchronizing field, indicating a possible wait for a message intended to pass through the second sub-network and concerning the cache line,
    the node is configured to have a first portion, forming part of the first sub-network and having read/write access to the directory of the node, and a second portion forming part of the second sub-network,
    the first portion is configured to apply a synchronizing field updating rule, upon receipt of a message concerning a cache line identified in the directory of the node and associated with another message intended to pass through the second sub-network, or upon receipt of a synchronization signal coming from the second portion, and
    the second portion is configured to transmit a synchronization signal to the first portion, upon receipt of a message intended for a partition of the main memory to which the node is associated or for a cache memory assigned to the node.

5. The system for data processing according to claim 4, wherein, for each node of the network, the first portion comprises a protocol engine for read/write access to the directory of the node, the protocol engine being programmed, as a finite-state machine, to apply the synchronizing field updating rule.

6. The system for data processing according to claim 1, wherein the first and second sub-networks are packet switching data transmission networks, and:
    the first protocol is a protocol for transmission of messages in a store-and-forward or cut-through mode, and
    the second protocol is a protocol for transmission of messages in a wormhole flow control mode.

7. The system for data processing according to claim 1, wherein cache memory lists sharing cache lines are represented in the network of processors for implementing a cache memory consistency management protocol, the representation of each list of cache memories sharing the same cache line being distributed between a plurality of directories of nodes of the processor network, including at least the directories of the nodes, as cache nodes, connected to processors, the cache memories of which temporarily store the cache line.

8. The system for data processing according to claim 7, wherein the directories between which the representation of a list of cache memories sharing the same cache line is distributed further comprise the directories of nodes for interconnection of the cache nodes to form a tree, distributed in the directories of the nodes of the network, for representation of the cache line, the correspondence table of each directory of a node of the tree comprising, for the cache line, status fields intended to indicate whether the node actually has a copy of the cache line, which directions among a set of predetermined directions lead to another node of the tree in the network, which direction leads to the node of the tree, as a root, historically having first stored the cache line, and whether the node is itself the root node of the tree.

9. An electronic chip comprising:
    a network of processors including cache memories, the network including a main memory shared between the processors and a plurality of nodes for access to the main memory interconnected with one another; and
    a system for data processing according to claim 1.

10. A method for data processing with management of a cache consistency in a network of processors including cache memories, the network including a main memory shared between the processors and a plurality of nodes for access to the main memory interconnected with one another, the method comprising:

generation of directories distributed between the nodes of the network, each directory comprising a table of correspondence between cache lines and information fields on the cache lines;

transmission of messages in a first sub-network for a first physical interconnection of nodes with one another implementing a first message transmission protocol, the first protocol providing read/write access to the correspondence tables of the directories during any passage, in the corresponding nodes, of a message passing through the first sub-network;

transmission of messages in a second sub-network for a second physical interconnection of nodes with one another, separate from the first sub-network, implementing a second message transmission protocol, different from the first transmission protocol, the second protocol excluding any read/write access to the correspondence tables of the directories during any passage in the corresponding nodes of a message passing through the second sub-network.

* * * * *